US010020932B2

(12) United States Patent
Michiels

(10) Patent No.: US 10,020,932 B2
(45) Date of Patent: Jul. 10, 2018

(54) SPLIT-AND-MERGE APPROACH TO PROTECT AGAINST DFA ATTACKS

(71) Applicant: NXP B.V., Eindhoven (NL)

(72) Inventor: Wilhelmus Petrus Adrianus Johannus Michiels, Eindhoven (NL)

(73) Assignee: NXP B.V., Eindhoven (NL)

( * ) Notice: Subject to any disclaimer, the term of this patent is extended or adjusted under 35 U.S.C. 154(b) by 182 days.

(21) Appl. No.: 14/941,474

(22) Filed: Nov. 13, 2015

(65) Prior Publication Data

US 2017/0141911 A1     May 18, 2017

(51) Int. Cl.
*H04L 29/06* (2006.01)
*H04L 9/00* (2006.01)
*H04L 9/06* (2006.01)

(52) U.S. Cl.
CPC ............. *H04L 9/003* (2013.01); *H04L 9/004* (2013.01); *H04L 9/0618* (2013.01); *H04L 9/0625* (2013.01); *H04L 9/0631* (2013.01); *H04L 2209/16* (2013.01)

(58) Field of Classification Search
CPC ..... H04L 9/003; H04L 9/0618; H04L 9/0625; H04L 9/0631
See application file for complete search history.

(56) References Cited

U.S. PATENT DOCUMENTS

| 2001/0042210 | A1* | 11/2001 | Blaker | G06F 7/728 |
| | | | | 713/190 |
| 2002/0075946 | A1* | 6/2002 | Seo | H04B 1/712 |
| | | | | 375/148 |
| 2003/0184553 | A1* | 10/2003 | Dawson | G06T 15/503 |
| | | | | 345/581 |
| 2004/0225705 | A1* | 11/2004 | Rumynin | G06F 7/5336 |
| | | | | 708/620 |
| 2005/0169462 | A1* | 8/2005 | Jung | G06F 7/725 |
| | | | | 380/28 |
| 2007/0014394 | A1 | 1/2007 | Harder et al. | |

(Continued)

FOREIGN PATENT DOCUMENTS

| EP | 2922234 A1 | 9/2015 |
| WO | 2014154270 A1 | 10/2014 |

OTHER PUBLICATIONS

Carlos Roberto Moratelli, "A Cryptography Core Tolerant to DFA Fault Attacks", SBCCI '06 Proceedings of the 19th annual symposium on Integrated circuits and systems design, pp. 190-195, Sep. 2006.*

(Continued)

*Primary Examiner* — Malcolm Cribbs
*Assistant Examiner* — Sher A Khan

(57) ABSTRACT

A device for performing a mapping an input message to an output message by a keyed cryptographic operation, wherein the keyed cryptographic operation includes a plurality of rounds. To protect against differential fault analysis attacks, the cryptographic operation is modified to apply a secret sharing approach to one of the rounds. Also, a portion of the computations are split into first and second shares, where the first share uses a first weight and the second share uses a second weight. The final operations are again merged into a single matrix multiplication. Cryptographic operations that have a substitution function and an affine transformation can be protected in this way.

24 Claims, 3 Drawing Sheets

(56) References Cited

U.S. PATENT DOCUMENTS

| | | | |
|---|---|---|---|
| 2010/0027781 A1* | 2/2010 | Galbi | H04L 9/0625 380/29 |
| 2010/0177887 A1* | 7/2010 | Ciet | G06F 7/728 380/28 |
| 2011/0268266 A1* | 11/2011 | Fujisaki | H04L 9/003 380/28 |
| 2014/0098951 A1* | 4/2014 | Choi | H04L 9/003 380/28 |
| 2015/0312039 A1* | 10/2015 | Michiels | H04L 9/3231 713/186 |
| 2016/0004591 A1* | 1/2016 | Duplys | G06F 21/75 714/777 |
| 2016/0050065 A1* | 2/2016 | Michiels | H04L 9/0631 380/28 |
| 2016/0056955 A1* | 2/2016 | Duplys | H04L 9/002 380/29 |
| 2016/0269175 A1* | 9/2016 | Cammarota | G09C 1/00 |
| 2016/0330019 A1* | 11/2016 | Michiels | H04L 9/0631 |

OTHER PUBLICATIONS

Synchrosoft MCFACT—Secure Data Processing Technology, Re-Trust Sixth Quarterly Meeting, Mar. 11, 2008, Villach, Austria, 108 pages.

Chow, A white-box DES implementation for DRM applications, Digital Rights Management Workshop—DRM 2002 (Joan Feigenbaum, ed.), Lecture Notes in Computer Science, vol. 2696, Springer, 2003, pp. 1-15.

Chow, et al., White-box cryptography and an AES implementation, Selected Areas in Cryptography—SAC 2002 (Kaisa Nyberg and Howard M. Heys, eds.) Lecture Notes in Computer Science, vol. 2595, Springer, 2003, pp. 250-270.

Mukhopadhyay, "An Improved Fault Based Atack of the Advanced Encryption Standard", Proceedings of the 2nd International Conference on Cryptology in Africa: Progress in Cryptology (Africacrypt'09), pp. 421-434, 2009.

Rivain, "Differential Fault Analysis on DES Middle Rounds", Cryptographic Hardware and Embedded Systems—CHES 2009, vol. 5747 of the series Lecture Notes in Computer Science, pp. 457-469.

Bar-El., H., et al., :The Sorcerer's Apprentice Guide to Fault Attacks, Proceedings of the IEEE, New York, US, vol. 94, No. 2, pp. 370-382, Feb. 1, 2006.

Manet, P., et al., "Integrated Evaluation Platform for Secured Devices", Reconfigurable Communication-Centric Systems-on-Chip, May 6, 2006.

Mukhopadhyay, D., "An improved Fault Based Attack of the Advanced Encryption Standard", Network and Parallel Computing, [Lecture Notes in Computer Science]; Springer International Publishing; pp. 421-434, Jun. 21, 2009.

Schneier, "Applied Cryptography, Second Edition, Protocols, Algorithrns, and Source Code in C," Section 2.2, 1996, ISBN 0-471-12845-7/ISBN 0-471-11709-9, p. 270-278.

\* cited by examiner

WHITE-BOX IMPLEMENTATION

FUNCTIONS $f_i$, $g_i$, FIXED

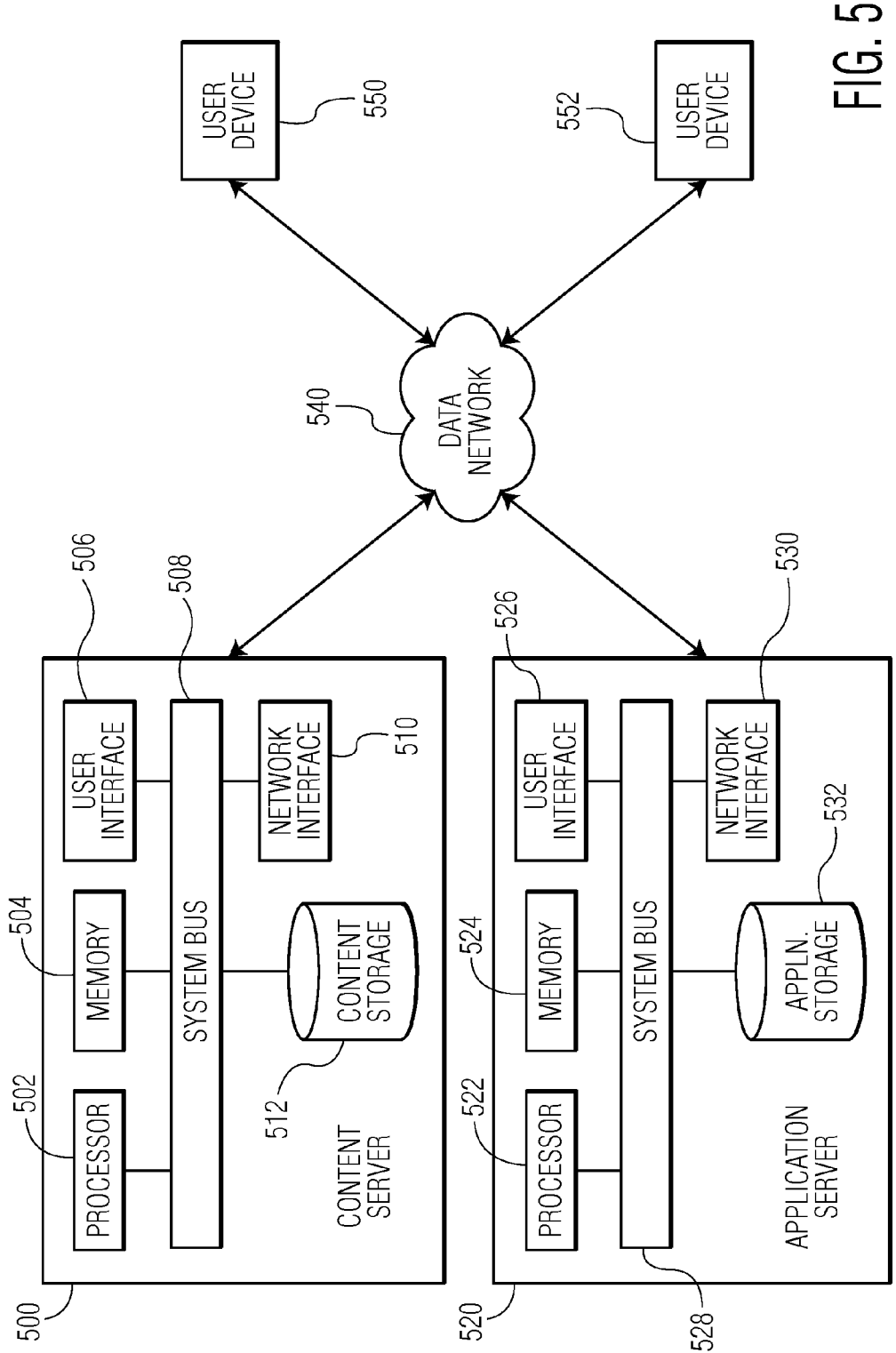

SPLIT-AND-MERGE APPROACH TO PROTECT AGAINST DFA ATTACKS

TECHNICAL FIELD

Various exemplary embodiments disclosed herein relate generally to securing cryptographic functions against differential fault analysis (DFA) attacks.

BACKGROUND

The Internet provides users with convenient and ubiquitous access to digital content. Because the Internet is a powerful distribution channel, many user devices strive to directly access the Internet. The user devices may include a personal computer, laptop computer, set-top box, Internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Cryptographic algorithms are typically designed with the black attack model in mind. This means that the attacker is assumed to have only access to the input/output behavior of the algorithm. In practice, however, an attacker typically has access to more information. The attacker may, for instance, have access to side-channel information on the execution of the algorithm. In this case, the attack model is referred to as being grey-box. In the most extreme case, called the white-box attack model, an attacker may even have full access to and full control over the execution environment running the algorithm.

In the white-box attack model, secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. For example, one way to obscure these functions is by the use of lookup tables.

Content providers must deliver content to legitimate users across a hostile network to a community where not all users or devices can be trusted. In some cases the user devices may have a hardware cryptographic solution to assist in the distribution of content. Even though this hardware solution may only allow observation of the input and output, it may also be possible as described above for an attacker to gain access to side channel information that allows the attacker to defeat the cryptographic function.

The situation where a hardware cryptographic solution is not possible has led to the development of white-box cryptography. In the white-box cryptography scenario it is assumed that the user has complete control of the hardware and software that provides access to the content, and an unlimited amount of time and resources to attack and bypass any content protection mechanisms. The secure software code that enforces the terms and conditions under which the content may be used should be tamper resistant. Digital rights management is a common application of secure software applications. The general approach in digital rights management for protected content distributed to user devices is to encrypt the digital content using for example, DES (Data Encryption Standard), AES (Advanced Encryption Standard), or using other known encryption schemes, and to use decryption keys to recover the digital content. These decryption keys must be protected to prevent unauthorized access to protected material.

In the digital right management scenario, the attacker has complete control of the software enforcing the management and access to the protected content. Accordingly, the attacker can modify software and also seek to obtain cryptographic keys used to encrypt the protected content. Such keys may be found by analyzing the software Both white-box and grey-box implementations of cryptographic functions are subject to side-channel attacks. Such attacks may successful in defeating the cryptographic functions.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to device for performing a mapping an input message to an output message by a keyed cryptographic operation, wherein the keyed cryptographic operation includes a plurality of rounds, including: a memory; and a processor in communication with the memory, the processor being configured to: split data processed in a first round to produce a first output and a second output, wherein the first output equals the second output; process a first input by a second round to produce a third output, wherein the first input is based upon the first output; process a second input by the second round to produce a fourth output, wherein the second input is based upon the second output; process a third input by a third round to produce a first share using a first weight, wherein the third input is based upon the third output; process a fourth input by the third round to produce a second share using a second weight, wherein the first and second weights are complementary, wherein the fourth input is based upon the fourth output; combine the first share and the second share to produce a combined output; and process the combined output by a fourth round.

Further various embodiments relate to a non-transitory machine-readable storage medium encoded with instructions for implementing mapping an input message to an output message by a keyed cryptographic operation, wherein the keyed cryptographic operation includes a plurality of rounds, including: instructions for splitting data processed in a first round to produce a first output and a second output, wherein the first output equals the second output; instructions for processing a first input by a second round to produce a third output, wherein the first input is based upon the first output; instructions for processing a second input by the second round to produce a fourth output, wherein the second input is based upon the second output; instructions for processing a third input by a third round to produce a first share using a first weight, wherein the third input is based upon the third output; instructions for processing a fourth input by the third round to produce a second share using a second weight, wherein the first and second weights are complementary, wherein the fourth input is based upon the fourth output; instructions for combining the first share and the second share to produce a combined output; and instructions for processing the combined output by a fourth round.

Further various embodiments relate to a method of mapping an input message to an output message by a keyed cryptographic operation, wherein the keyed cryptographic operation includes a plurality of rounds, including: splitting data processed in a first round to produce a first output and a second output, wherein the first output equals the second output; processing a first input by a second round to produce a third output, wherein the first input is based upon the first output; processing a second input by the second round to produce a fourth output, wherein the second input is based upon the second output; processing a third input by a third round to produce a first share using a first weight, wherein the third input is based upon the third output; processing a fourth input by the third round to produce a second share using a second weight, wherein the first and second weights are complementary, wherein the fourth input is based upon the fourth output; combining the first share and the second share to produce a combined output; and processing the combined output by a fourth round.

Various embodiments are described, wherein the plurality of rounds include a substitution function and an affine transformation.

Various embodiments are described, wherein: the cryptographic operation is an advanced encryption standard (AES) operation; a round includes a matrix multiplication of the intermediate state by a matrix $M_r$, where r specifies the round; processing the third input by a third round to produce a first share using a first weight includes multiplying $M_3$ by $$\begin{pmatrix} \alpha_0 & 0 & \ldots & 0 \\ 0 & \alpha_1 & \ldots & 0 \\ \vdots & \vdots & \ddots & \vdots \\ 0 & 0 & \ldots & \alpha_{15} \end{pmatrix};$$

and processing the fourth input by a third round to produce a first share using a second weight includes multiplying $M_3$ by $$\begin{pmatrix} \alpha_0 \oplus 1 & 0 & \ldots & 0 \\ 0 & \alpha_1 \oplus 1 & \ldots & 0 \\ \vdots & \vdots & \ddots & \vdots \\ 0 & 0 & \ldots & \alpha_{15} \oplus 1 \end{pmatrix}.$$

Various embodiments are described, wherein combining the first share and the second share to produce a combined output includes XORing the first share and the second share.

Various embodiments are described, wherein the cryptographic operation is a data encryption standard (DES) operation.

Various embodiments are described, wherein the first weight is randomly generated by a random generator for each execution of the third round.

Various embodiments are described, wherein the first weight is randomly generated by a hardware random generator for each execution of the third round.

Various embodiments are described, wherein the first weight is selected based upon the output of the first round.

BRIEF DESCRIPTION OF THE DRAWINGS

In order to better understand various exemplary embodiments, reference is made to the accompanying drawings, wherein:

FIG. 5 illustrates a system for providing a user device secure content and a software application that processes the secure content.

To facilitate understanding, identical reference numerals have been used to designate elements having substantially the same or similar structure and/or substantially the same or similar function.

DETAILED DESCRIPTION

Figure 1:
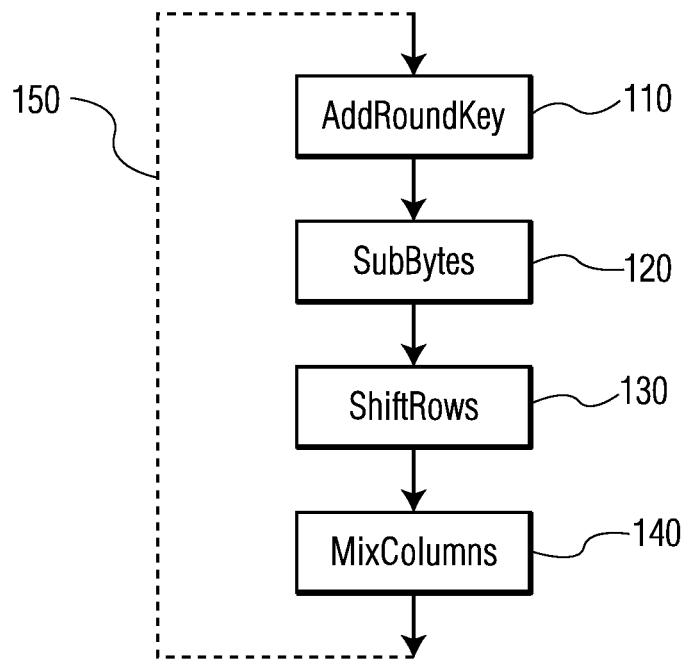
FIG. 1 illustrates the main steps of a round of AES.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Below methods and techniques for countering a differential fault analysis (DFA) attack will be described in the context of a white-box attack model, but the described methods and techniques may also be applied to hardware cryptographic solutions where the grey-box model is applicable because DFA may be performed on the hardware cryptographic solutions.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented. While the description of embodiments below are directed to software implementation running on a processor, it is noted that these embodiments may also be partially or completely implemented in hardware as well. The lookup tables and finite state machines that are described may be implemented in hardware to carry out the various functions described.

The embodiments described below using a split-and-merge approach in a white-box implementation may also be applied to grey-box cryptographic implementations where an attacker may apply differential fault analysis (DFA) attacks.

A table-based approach to a white-box implementation of the Advanced Encryption Standard (AES) and the Data Encryption Standard (DES) were proposed in the following papers: "White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1"; and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2". Chow 1 and Chow 2 disclose methods of using a table-based approach to hide the cryptographic key by a combination of encoding its tables with random bijections, and extending the cryptographic boundary by pushing it out further into the containing application.

As noted, for many cryptographic operations it is desired to have a white-box implementation. The invention may be applied, for example, to symmetric and asymmetric cryptographic operations. Also, the invention may be applied to block ciphers, stream ciphers, message authentication schemes, signature schemes, etc. Note that the invention may also be applied to hash functions. The latter is especially useful if the hash function is used as a building block which processes secret information, e.g., a secret key, secret data, etc. For example, the invention may be applied to a hash function used in a keyed-Hash Message Authentication Code (HMAC or KHMAC). Well known block ciphers include: Advanced Encryption Standard (AES), Secure And Fast Encryption Routine, (SAFER, and variants SAFER+ and SAFER++), Blowfish, Data Encryption Standard (DES), etc. A well-known stream cipher is RC4. Moreover any block cipher can be used as stream cipher using an appropriate mode of operation, e.g., Cipher feedback (CFB), Counter mode (CTR), etc.

The input message can represent, e.g., encrypted content data, such as multi-media data, including audio and/or video data. The encrypted content data may also include encrypted software, e.g., encrypted computer code representing some computer application, e.g., a computer game, or an office application. The input message may also represent a key for use in a further cryptographic operation. The latter may be used, for example, in a key exchange protocol, wherein a white-box implementation according to the invention encrypts and/or decrypts data representing a new key. The input data may also be plain data, for example, plain user data. The latter is especially advantageous in message authentication schemes. A white-box implementation according to the invention may have the property that the implementation may only be used for encryption, only be used for decryption, but not for both. For example, this property can be achieved if the implementation uses look-up tables which are not bijective, for example, a look-up table having more input bits than output bits. Accordingly, if a user only has a white-box decryptor, he may verify a MAC code but not create new MACS. This strengthens the non-repudiation properties of such a message authentication scheme.

The white-box implementation may be implemented using a plurality of basic blocks. The plurality of basic blocks is interconnected, in the sense that some of the blocks build on the outputs of one or more of the previous blocks. A basic block may be implemented in hardware, for example, as a computer chip. A basic block may use a switch board, a state machine or any other suitable construction for implementing functions in computer hardware. A basic block may also be implemented in software running on a general purpose computer chip, e.g. a microprocessor. For example, a basic block may use a plurality of computer instructions, including arithmetical instructions, which together implement the functionality of the basic block. A widely used implementation for the basic block, which may be used both in software and hardware, is a look-up table. For example, Chow 1 and Chow 2 take this approach to implement the AES and DES block ciphers. A look-up table implementation includes a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bit-strings, the look-up table may be restricted to storing a list of the output values. A particular input number may, e.g., be mapped to the particular output which is stored at a location indicated by the number. Further, finite state machines or code obfuscation may be used to implement the white-box implementation.

For example, a look up table for a function may be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to output in irregular ways. A white-box implementation can be further obfuscated, as is explained below, by applying to one or more of its look-up tables a fixed obfuscating input encoding and a fixed output encodings. The results of applying a fixed obfuscating input encoding and output encodings is then fully pre-evaluated. Using this technique, a look-up table would be replaced by an obfuscated look-up table which has the same dimensions, that it takes the same number input bits and produces the same number of output bits. The input encoding and output encoding used in such obfuscation are not explicit in the final white-box implementation.

The network of basic blocks are arranged to compute an output message when they are presented with an input message. Typically, the input message is operated upon by a number of basic input blocks. A number of further basic blocks may take input from one or more of the basic input blocks and/or from the input. Yet further basic blocks can take input in any combination of the input message, the output of basic input blocks and the output of the further basic blocks. Finally some set of basic exit blocks, i.e., at least one, produce as output all or part of the output-message. In this manner a network of basic blocks emerges which collectively computes the mapping from the input message to output message.

The key used may be a cryptographic key and may contain sufficient entropy to withstand an anticipated brute force attack. It is noted that in a white-box implementation, the key is typically not explicitly present in the implementation. This would risk the key being found by inspection of the implementation. Typically, the key is only present implicitly. Various ways are known to hide a key in a cryptographic system. Typically, at least the method of partial evaluation is used, wherein a basic block which needs key input is evaluated in-so-far that it does not depend on the input-message. For example, a basic operation wherein an input-value, a masking value, which does not depend on the input-message, e.g. a value from a substitution box (S-box), and a key-value need to be XORed can be partially evaluated by XORing the key value and the masking value together beforehand. In this way the operation still depends on the key-value although the key-value is not explicitly present in the implementation. Instead, only the XOR between the key-value and masking-value is present in the implementation. Note that, more complicated ways and/or further ways of hiding the keys are compatible with embodiments of this invention.

Now a relevant question is how to implement a cryptographic algorithm, such that it provides protection against a grey-box or even white-box attack. A powerful technique in both a grey-box and white-box environment is Differential Fault Analysis (DFA). Here, faults are injected in one or more executions and the key is next derived from the observed changes in the output. An example is presented in "An improved fault based attack of the advanced encryption standard," by D. Mukhopadhyay, Proceedings of the 2nd International Conference on Cryptology in Africa: Progress in Cryptology (Africacrypt'09), pages 421-434, 2009. Mukhopadhyay describes how to derive the AES key by comparing the outputs of multiple executions, where the different executions differ in that a single input/output value of an S-box at the start of round 8 or 9 is altered. This change may be arbitrary and unknown. The attack may be performed for only 1 pair of outcomes (a good one and an altered one) to gain information about the key.

A known technique to protect against DFA attacks is to execute the algorithm twice and to check whether the results are the same. To disable this countermeasure, an attacker may disable the check. Particularly in the white-box environment, this is not difficult to do. An alternative approach is described in the embodiments below. The alternative approach is also based on adding a redundant computation, but it does not use an explicit check.

The first aspect of the alternative approach is that a secret sharing approach is applied to protect the output bytes of Round 10 of AES and/or intermediate values from which these output bytes are derived and which are located after the S-box operation of Round 9.

Let $v_i$ be such an output byte or intermediate value. The index i with i=0, 1, . . . , 15 indicates the number of the output byte to which the value relates. Then, applying secret sharing to this value means that instead of $v_i$, a number of shares, say s, written as $v_{i,0}, v_{i,1}, \ldots, v_{i,s-1}$, are computed such that $v_i = f(v_{i,0}, v_{i,1}, \ldots, v_{i,s-1})$ for some function $f$. Preferably, the function $f$ is such that $v_i$ is independent on any proper subset of the shares.

The second aspect of the alternative approach is to compute the shares of $v_i$. The computation of $v_i$ is split before Round 8 such that different parts compute a different subset of the shares. To formalize this, some terminology and notation is introduced.

Let $I_H$ be an implementation of a function H. Then, a set $\sigma$ of values is an intermediate state of $I_H$ if the implementation may be split into two parts, where the first part computes $\sigma$ from the input and the second part computes the output from solely the intermediate state $\sigma$. For instance, consider a straightforward implementation of function $E_K$ defining AES encryption with key K. Then, the outcome of any AES operation is an intermediate state for $E_K$. A subset of a state is called an incomplete intermediate state, and two (incomplete) states $\sigma_0$ and $\sigma_1$ are called overlapping if $\sigma_0 \subseteq \sigma_1$ or $\sigma_1 \subseteq \sigma_0$.

Now, two implementations $I_0$ and $I_1$ are said to be crossing if they do not have equal intermediate states.

The second part of the alternative approach may now be formalized as follows. There exists at least two shares $v_{i,j_0}$, $v_{i,j_1}$ that are computed from (incomplete) intermediate states $x_{i,j_0}$ and $x_{i,j_1}$ (possibly the same) from Round 7 or before. They are computed via the functions $G_{i,j_0}$ and $G_{i,j_1}$, respectively, and the implementations of $G_{i,j_0}$ and $G_{i,j_1}$ are not crossing.

Now it will be shown how this works against the fault injection attack of, for instance, Mukhopadhyay. This attack uses the fact that if we change a single S-box input or output in Round 8 or 9, then this has the effect that the 4 bytes of an output column of Round 9 change by an additive term. Furthermore, the additive terms for the 4 bytes differ by a scalar multiplication. This property is exploited in the output of the complete algorithm, i.e., Round 10. The value of this scalar follows from the MixColumns operation.

Now, suppose that the alternative approach is applied such that the intermediate states of the implementations of $G_{i,j_0}$ and $G_{i,j_1}$ are disjoint (which is a stronger assumption that that the implementations are non-crossing). Then, changing an intermediate value in Round 8 or 9, only changes the computation of a subset of the shares that relate to the output of Round 9. The effect of this on the output of the algorithm will now also depend on how the values $v_i$ to which the alternative approach is applied are split into shares. If this is, for instance, done pseudo-randomly, then the relation as exploited by Mukhopadhyay will no longer hold.

Above, the alternative approach is formulated in terms of AES. In response to the attack of Mukhopadhyay, the alternative approach may also be applied other ciphers including multiple rounds (for example DES), where the rounds include a substitution and an affine transformation function. In this case at least one substitution operation and at least one affine transformation operation is between the moment the computation splits and that it merges again (i.e., the span of the functions $G_{i,j_0}$ and $G_{i,j_1}$).

It is also noted that DES may be attacked by making a change in round 9 or later (see "Differential Fault Analysis on DES Middle Rounds" by Rivain (Cryptographic Hardware and Embedded Systems—CHES 2009, Volume 5747 of the series Lecture Notes in Computer Science pp 457-469)). The embodiments described below may also be used to counter this attack.

Below white-box embodiments are described using the AES (Advanced Encryption Standard) block cipher, because AES has become a widely used standard for block ciphers. AES is a block cipher with a block size of 128 bits or 16 bytes. The plaintext is divided in blocks of 16 bytes which form the initial state of the encryption algorithm, and the final state of the encryption algorithm is the cipher text. At any given point in the encryption algorithm these 16 bytes are the state of the encryption algorithm. To conceptually explain AES, the bytes of the state are organized as a matrix of 4×4 bytes. AES includes a number of rounds, which depend on the key size. Each round includes similar processing steps operating on bytes, rows, or columns of the state matrix, each round using a different round key in these processing steps. In the discussion using AES as an example, it is noted that AES defines a round in a specific manner. In the embodiments below, a round is any grouping of steps that includes at least one non-linear mapping function, such as an S-box in AES. Accordingly, a round as described below includes one non-linear mapping function and any combination of other steps of the cryptographic function. Further, the boundary of the round may start with the non-linear mapping function, for example an S-box, or any other operation that may be merged with the non-linear mapping function, for example a key addition.

FIG. 1 illustrates some main processing steps of a round of AES. The processing steps include:
AddRoundKey 110—each byte of the state is XORed with a byte of the round key;
SubBytes 120—a byte-to-byte permutation using a lookup table;
ShiftRows 140—each row of the state is rotated a fixed number of bytes; and
MixColumns 150—each column is processed using a modulo multiplication in GF(28).

The steps SubBytes 120, ShiftRows 130, and MixColumns 150 are independent of the particular key used. The key is applied in the step AddRoundKey 110. Except for the step ShiftRows 140, the processing steps can be performed on each column of the 4×4 state matrix without knowledge of the other columns. Therefore, they can be regarded as 32-bit operations as each column consists of four 8-bit values. Dashed line 150 indicates that the process is repeated until the required number of rounds has been performed.

Each of these steps or a combination of steps may be represented by a lookup table or by a network of lookup tables. If the AddRoundKey 110 step is implemented by XORing with the round key, then the key is visible to the attacker in the white-box attack context. The AddRoundKey 110 step can also be embedded in lookup tables, which makes it less obvious to find out the key. In fact, it is possible to replace a full round of AES by a network of lookup tables. For example, the SubBytes 120, ShiftRows 130, and MixColumns 150 steps may be implemented using table lookups. Below a possible white-box implementation of AES in sufficient detail is discussed to describe the embodiments of the invention below, but further detailed descriptions of such an implementation are found in Chow 1. Also, other variations in the lookup table implementation may be used which are within the scope of the invention.

Figure 2:
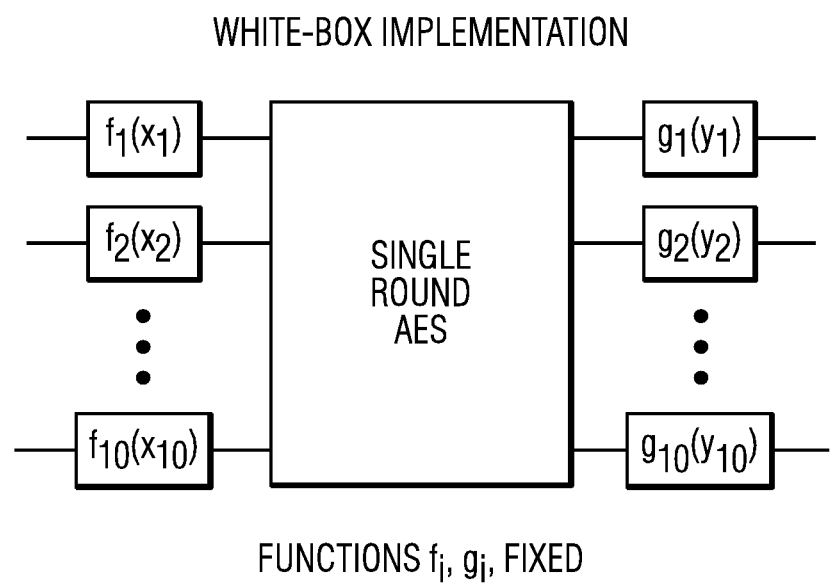
FIG. 2 illustrates a white-box AES implementation with fixed encodings on the input of the rounds.

Both the table-based white-box implementations and the finite state machine implementations have the property that all intermediate values in the implementation are encoded (as compared to a standard implementation). Examples of white-box implementations using finite state machines are disclosed in U.S. Patent Publication 2007/0014394 entitled "Data Processing Method" and a presentation at the Re-trust Sixth Quarterly Meeting entitled "Synchrosoft MCFACT™ Secure Data Processing Technology" by Wulf Harder and Atis Straujums dated Mar. 11, 2008, which each are hereby incorporated by reference for all purposes as if fully set forth herein. FIG. 2 illustrates a white-box AES implementation with fixed encodings on the input of the rounds, i.e., on the input of the S-boxes. As shown, each of the 16 input bytes are encoded by $f_i$ and each of the output bytes are encoded by $g_i$.

In order to describe embodiments of the invention, a basic description of a table-based white-box AES implementation will be described. For a more detailed description of a method for implementing a table-based white-box AES see Chow 1. Chow 1 illustrates a specific implementation that breaks up certain functions using tables of specified sizes. It is well understood that various other divisions of the tables may be made resulting in different functions for the look-up tables and different sizes. Further, while the embodiments of the invention described below use a table-based white-box implementation of AES, other ciphers and cryptographic functions may be implemented according to the embodiments described. Also, other types of white-box implementations may be used instead of the table-base implementation, for example, a finite-state implementation.

The description of the table-based white-box AES is split into two steps. In the first step, a round of AES is described as a network of lookup tables. In the second step, the tables are obfuscated by encoding their input and output.

Step 1: Implementing AES as a Network of Lookup Tables.

AES operates on data blocks of 16 bytes. These are typically described as a 4×4 byte matrix, called the state including bytes $x_{1,1}, x_{1,2}, x_{1,3}, \ldots x_{4,4}$. A round of AES as described above with respect to FIG. 1 include the following operations: AddRoundKey 110, SubBytes 120, ShiftRows 130, and MixColumns 140. The first two operations, AddRoundKey and SubBytes can be merged into a single T-box operation. That is, we can define a byte-to-byte function $T_{i,j}$ for input byte $x_{i,j}$ as $T_{i,j}(x_{i,j})=S(x_{i,j} \oplus k_{i,j})$ where $k_{i,j}$ is a single byte of a 16 byte round key based upon the AES key. Let $y_{i,j}$ be the output of $T_{i,j}$. The ShiftRows operations is just an index-renumbering of the output bytes $y_{i,j}$. For ease of presentation, this operation is omitted in this description, but may be incorporated into the look-up table implementing $T_{i,j}$ or implemented as a separate manipulation of the state matrix. In the MixColumns step, an output byte of the round is computed from the 4 output bytes $y_{1,j}$, $y_{2,j}$, $y_{3,j}$, and $y_{4,j}$ via the algebraic expression $z_{l,j}=MC_{l,1} \cdot y_{1,j} \oplus MC_{l,2} \cdot y_{2,j} \oplus MC_{l,3} \cdot y_{3,j} \oplus MC_{l,4} \cdot y_{4,j}$ in GF(28) for some constants $MC_{l,r}$.

Now define a lookup table for each byte-to-byte function $Q_{i,j,l}(x_{i,j})=MC_{l,i} \cdot T_{i,j}(x_{i,j})$ with i, j, l=1, 2, . . . , 16. Then any output byte $z_{l,j}$ may be computed by XORing the results of these lookup tables, i.e., $z_{l,j}=Q_{1,j,l}(x_{1,j}) \oplus Q_{2,j,l}(x_{2,j}) \oplus Q_{3,j,l}(x_{3,j}) \oplus Q_{4,j,l}(x_{4,j})$. Note that the index i, j, l of Q-box can be interpreted as "the contribution of input byte i, j of a round to output byte l, j of the round". The XOR may be implemented to operate on each of two nibbles (i.e., 4-bit values) as a lookup table to reduce the size of the XOR tables. Accordingly, the Q-box may be implemented to produce output nibbles so that the size of the tables is reduced. Therefore, the computation of each output byte $z_{l,j}$ of an AES-round has been described as a network of lookup tables. The network of lookup tables to compute a single output nibble of byte $z_{2,3}$ is shown in FIG. 3.

Figure 3:
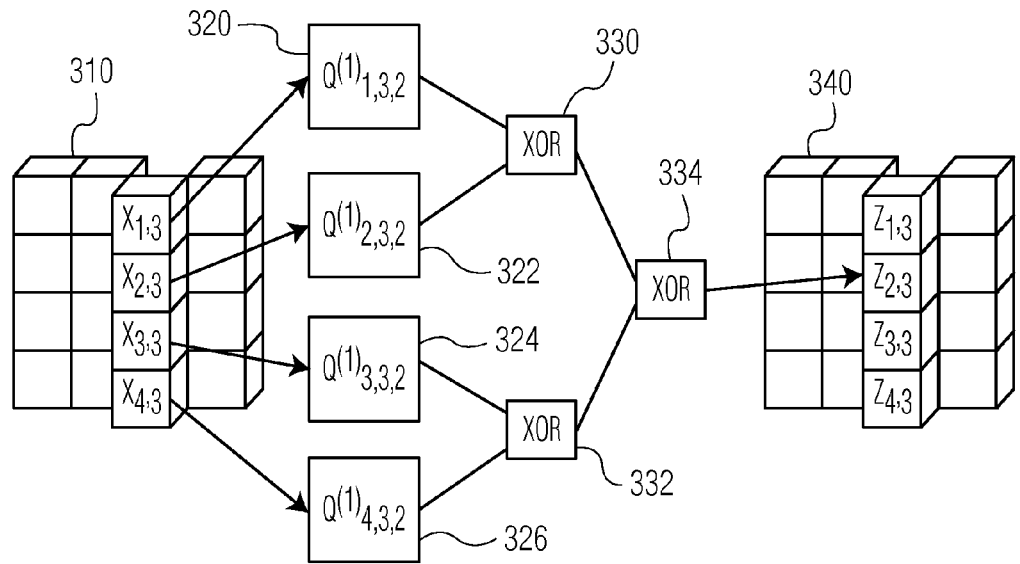
FIG. 3 illustrates the computation of one output nibble by means of a network of look-up tables.

FIG. 3 illustrates the computation of one output nibble by means of a network of look-up tables. The superscript index (1) in the Q-boxes indicates that the tables only provide the first nibble of the output of the Q-box. A set of input bytes $x_{1,3}, x_{2,3}, x_{3,3},$ and $x_{4,3}$ in the input state 310 are input into the Q-boxes 320, 322, 324, 326. The outputs $u_1, u_2$ of lookup tables 320 and 322 are fed into the XOR 330, and the outputs $u_3, u_5$ of lookup table 324 and XOR 330 are fed into the XOR 332. The outputs $u_4, u_6$ of table 326 and XOR 332 are fed into XOR 334. The output of XOR 334 is the first nibble of the output $z_{2,3}$ of output state 340. The second nibble of the output $z_{2,3}$ of output state 340 may be calculated in the same way using additional Q-boxes along with a similar XOR network. Further, additional sets of tables may be implemented to completely convert the input state 310 into the output state 340 by receiving a column of bytes from the input state and converting them into the output of the corresponding column of the output state.

Step 2: Obfuscating the Tables and the Intermediate Values

Figure 4:
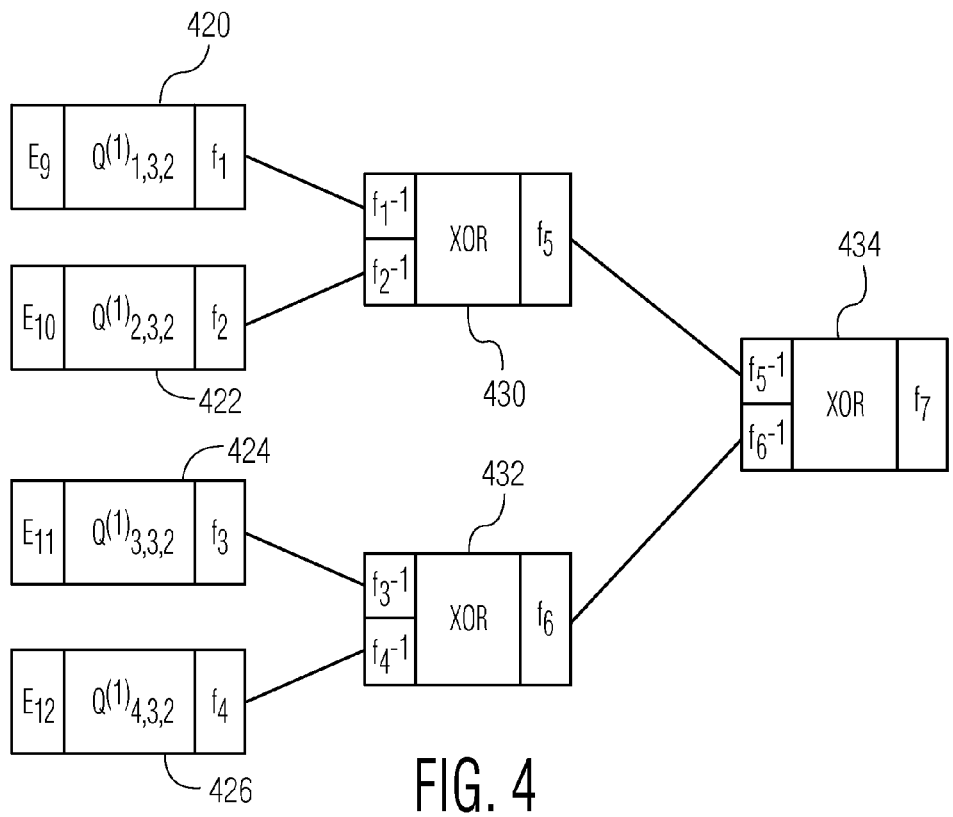
FIG. 4 illustrates a portion of the network table of FIG. 3 obfuscated by encoding the inputs and outputs.

In the implementation depicted in FIG. 3, the key may easily be extracted from the Q-boxes. Just applying the inverse MixColumns multiplication and the inverse S-box to the output reveals the plain AddRoundKey operation. To prevent this, the input and outputs of all lookup tables are encoded with arbitrary bijective functions. This is described in Chow 1. This means that a lookup table is merged with an encoding function that encodes the output and with a decoding function that decodes the input. The encodings are chosen such that the output encoding of one table matches the input encoding assumed in the next tables. A portion of the implementation of FIG. 3 is depicted in FIG. 4 for the first round. In this example, the input to the round is not encoded in order to be compliant with AES, but the output of the round is encoded. The output encoding is handled in the next round. That is, unlike the first round, the second round (and the later rounds) assumes that the input is encoded. Alternatively, the first round may receive an encoded input. This input encoding must then be applied elsewhere in the software program containing the white-box implementation. Similarly, the last round may or may not include an output encoding depending on whether the output is to be AES compliant. Note that in the white-box implementation obtained, both the lookup tables and the intermediate values are obfuscated.

FIG. 4 illustrates a portion of the network of tables of FIG. 3 obfuscated by encoding the inputs and outputs. The lookup tables 420, 422, 424, 426 correspond to lookup tables 320, 322, 324, 326 of FIG. 3. The inputs of lookup tables 420, 422, 424, 426 are encoded by functions $E_9$, $E_{10}$, $E_{11}$, $E_{12}$, respectively. The outputs of lookup tables 420, 422, 424, 426 are encoded by functions $f_1$, $f_2$, $f_3$, $f_4$ respectively. XOR 430 corresponds to XOR 330. The inputs of XOR 430 decode input using $f_1^{-1}$ and $f_2^{-1}$. The output of XOR 430 is then encoded by function $f_5$. In a similar manner XORs 432, 434 have input decodings and output encodings as illustrated. The output $z_{2,3}$ is encoded using $f_7$.

Below an embodiment using secret split shares is described for an AES implementation. This description is for an AES implementation using secret split shares may be implemented using software in a white-box environment (e.g., using table lookups or finite state machines) or in a hardware AES implementation in a grey-box environment.

As described above, the first two operations of an AES round are implemented to operate on the individual bytes of the state. Further, the last two operations may be merged into a single 16×16-byte matrix multiplication. That is, the output of round r can be obtained as $M_r(x)$ for a 16 byte square matrix $M_r$, where x is the intermediate state after the SubBytes operation.

Now it will be shown how secret split shares may be applied to an AES white-box implementation. Related to the first aspect of the secret sharing approach described above, secret sharing may be applied to the output state of Round 9, i.e., to the output of $M_9$.

Let $b_i$ be an output byte of $M_9$. Then, secret sharing may be implemented by computing shares $b_{i,0} = \alpha_i \cdot b_i$ and $b_{i,1} = (\alpha_i \oplus 1) \cdot b_i$ instead of $b_i$. This may be done by applying the complementary weights $\alpha_i$ and $\alpha_i \oplus 1$ to $b_i$. The value $b_i$ may be obtained from the two shares by XORing the two shares. Computing these two shares instead of $b_i$ may be implemented by replacing matrix $M_9$ by matrix $L_9 \cdot M_9$, where matrix $L_9$ is a 32×16 byte-matrix given by:

$$L_9 = \begin{pmatrix} \alpha_0 & 0 & \ldots & 0 \\ \alpha_0 \oplus 1 & 0 & \ldots & 0 \\ 0 & \alpha_1 & \ldots & 0 \\ 0 & \alpha_1 \oplus 1 & \ldots & 0 \\ \vdots & \vdots & \ddots & \vdots \\ 0 & 0 & \ldots & \alpha_{16} \\ 0 & 0 & \ldots & \alpha_{15} \oplus 1 \end{pmatrix}.$$

After the multiplication of $L \cdot M_9$, the output bytes $b_i$ of round 9 may be computed from its two shares by XORing them. The result is input to the AddRoundKey operation of Round 10. This concludes the implementation of the first aspect of the secret sharing approach.

The second aspect of the secret sharing approach was formulated to compute the shares before Round 8 such that different parts compute a different subset of the shares. This means that the computation is split before round 8 and that the different splits compute $b_{i,0}$ and $b_{i,1}$, respectively. It will now be explained in more detail how this may be implemented.

Analogously to Round 9, the matrix multiplication in Round 7 is replaced by $L_7 \cdot M_7$ with $$L_7 = \begin{pmatrix} 1 & 0 & \ldots & 0 \\ 1 & 0 & \ldots & 0 \\ 0 & 1 & \ldots & 0 \\ 0 & 1 & \ldots & 0 \\ \vdots & \vdots & \ddots & \vdots \\ 0 & 0 & \ldots & 1 \\ 0 & 0 & \ldots & 1 \end{pmatrix}.$$

The consequence of post-multiplying with $L_7$ is that each output byte of $M_7$ is doubled. Hence, the outcome is given by $(x_0, y_0, x_1, y_1, \ldots, x_{15}, y_{15})$ with $(x_0, x_1, \ldots, x_{15}) = (y_0, y_1, \ldots, y_{15})$ being the output of $M_7$. Now the implementation of Round 8 is applied to both $(x_0, x_1, \ldots, x_{15})$ and $(y_0, y_1, \ldots, y_{15})$. Observe that this corresponds to the split mentioned in the second aspect of the secret sharing approach.

Now, the computation on $(x_0, x_1, \ldots, x_{15})$ computes the first set of shares $b_{0,0}, b_{1,0}, \ldots, b_{15,0}$ of the output bytes of Round 9, and the computation on $(y_0, y_1, \ldots, y_{15})$ computes the second set of shares $b_{0,1}, b_{1,1}, \ldots, b_{15,1}$ of the output bytes of Round 9. The first and second set of share are computed by applying complementary weights so that when the shares are combined, the correct result is obtained. This may be realized by implementing Round 9 for $(x_0, x_1, \ldots, x_{15})$ via matrix $L_{9,0} \cdot M_9$ instead of $L_9 \cdot M_9$, where matrix $L_{9,0}$ is the 16×16 byte-matrix given by $$L_{9,0} = \begin{pmatrix} \alpha_0 & 0 & \ldots & 0 \\ 0 & \alpha_1 & \ldots & 0 \\ \vdots & \vdots & \ddots & \vdots \\ 0 & 0 & \ldots & \alpha_{15} \end{pmatrix}$$

and by implementing Round 9 for $(y_0, y_1, \ldots, y_{15})$ via matrix $L_{9,1} \cdot M_9$, where matrix $L_{9,1}$ is the 16×16 byte-matrix given by $$L_{9,1} = \begin{pmatrix} \alpha_0 \oplus 1 & 0 & \ldots & 0 \\ 0 & \alpha_1 \oplus 1 & \ldots & 0 \\ \vdots & \vdots & \ddots & \vdots \\ 0 & 0 & \ldots & \alpha_{15} \oplus 1 \end{pmatrix}.$$

The first set of shares $b_{0,0}, b_{1,0}, \ldots, b_{15,0}$ of the output bytes of Round 9 and the second set of shares $b_{0,1}, b_{1,1}, \ldots, b_{15,1}$ may now be combined and input into round 10.

Above it was mentioned that the variables are split into shares in a (pseudo)-random fashion. Although in the embodiment described above the values $\alpha_i$ can be chosen (pseudo)-randomly, they are fixed within an implementation. Alternatively, the split may be made pseudo-randomly over different executions. This can, for instance, be implemented by changing $L_{9,0}$ and $L_{9,1}$ before or after each execution. For example the values of $\alpha_i$ may be chosen based upon a certain value of the input to the round. As a result the values of $\alpha_i$ will vary for each execution of the AES algorithm based upon the input. In a hardware implementation, the values of $\alpha_i$ may be chosen based upon a hardware random number generator.

The above description shows the split shares as being processed in consecutive rounds. It is further possible that the rounds are not consecutive. For example, the split shares may be made before round 7 as described above with intermediate rounds before the two spit computations are merged again.

The embodiment described above may be applied to a white-box AES implementation or a hardware grey-box AES implementation. Further, the embodiment described above may also be applied other cryptographic schemes that have a round that includes a substitution function followed by an affine transformation. A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, a white-box system may include a computer implementing a white-box computer program. Such system, may also include other hardware elements including storage, network interface for transmission of data with external systems as well as among elements of the white-box system.

In an embodiment of the invention, the computer program may include computer program code adapted to perform all the steps of a method according to the invention when the computer program is run on a computer. Preferably, the computer program is embodied on a non-transitory computer readable medium.

Further, because white-box cryptography is often very complicated and/or obfuscated it is tedious for a human to write. It is therefore of advantage to have a method to create the cryptographic system according to the embodiments of the invention in an automated manner.

A method of creating the cryptographic system according to the invention may be implemented on a computer as a computer implemented method, or in dedicated hardware, or in a combination of both. Executable code for a method according to the invention may be stored on a computer program medium. In such a method, the computer program may include computer program code adapted to perform all the steps of the method when the computer program is run on a computer. The computer program is embodied on a non-transitory computer readable medium.

The cryptographic system described herein may be implemented on a user device such as a mobile phone, table, computer, set top box, smart TV, etc. A content provider, such as a television network, video stream service, financial institution, music streaming service, etc., may provide software to the user device for receiving encrypted content from the content provider. That software may have the encryption key embedded therein as described above, and may also include binding strings as described above. Then the content provider may send encrypted content to the user device, which may then decrypt using the supplied software and use the content.

FIG. 5 illustrates a system for providing a user device secure content and a software application that processes the secure content. The system includes a content server 500, application server 580, user devices 550, 552, and a data network 540. The user devices 550, 552 may request access to secure content provided by the content server 500 via data network 540. The data network can be any data network providing connectivity between the user devices 550, 552 and the content server 500 and application server 5580. The user devices 550, 552 may be one of a plurality of devices, for example, set top boxes, media streamers, digital video recorders, tablets, mobile phones, laptop computers, portable media devices, smart watches, desktop computers, media servers, etc.

The user request for access may first require the downloading of a software application that may be used to process the secure content provided by the content server 500. The software application may be downloaded from the application server 580. The software application may be obscured using the techniques described above as well as operate as described above. Once the user devices 550, 552 install the software application, the user device may then download secure content from the content server 500 and access the secure content using the downloaded software application. For example, the downloaded software application may perform decryption of encrypted content received from the content server. In other embodiments, the software application may perform other secure operations, such as for example, encryption, digital signature generation and verification, etc.

The content server 500 may control the access to the secure content provided to the user devices 550, 552. As a result when the content server 500 receives a request for secure content, the content server 500 may transmit the secure content to the requesting user device. Likewise, the application server 520 may control access to the software application provided to the user devices 550, 552. As a result when the content server 520 receives a request for the software application, the application server 520 may transmit the software application to the requesting user device. A user device requesting the software application or secure content may also be authenticated by the respective servers, before providing the software application or secure content to the user device.

The content server 500 may include a processor 502, memory 504, user interface 506, network interface 510, and content storage 512 interconnected via one or more system buses 580. It will be understood that FIG. 5 constitutes, in some respects, an abstraction and that the actual organization of the components of the device 500 may be more complex than illustrated.

The processor 502 may be any hardware device capable of executing instructions stored in memory 504 or storage 512. As such, the processor may include a microprocessor, field programmable gate array (FPGA), application-specific integrated circuit (ASIC), or other similar devices.

The memory 504 may include various memories such as, for example L1, L2, or L3 cache or system memory. As such, the memory 502 may include static random access memory (SRAM), dynamic RAM (DRAM), flash memory, read only memory (ROM), or other similar memory devices.

The user interface 506 may include one or more devices for enabling communication with a user such as an administrator. For example, the user interface 506 may include a display, a mouse, and a keyboard for receiving user commands.

The network interface 510 may include one or more devices for enabling communication with other hardware devices. For example, the network interface 510 may include a network interface card (NIC) configured to communicate according to the Ethernet protocol. Additionally, the network interface 510 may implement a TCP/IP stack for communication according to the TCP/IP protocols. Various alternative or additional hardware or configurations for the network interface 510 will be apparent.

The content storage 512 may include one or more machine-readable content storage media such as read-only memory (ROM), random-access memory (RAM), magnetic disk storage media, optical storage media, flash-memory devices, or similar storage media. In various embodiments, the content storage 512 may store content to be provided to users.

The application server 520 includes elements like those in the content server 500 and the description of the like elements in the content server 500 apply to the application server 520. Also, the content storage 512 is replaced by application storage 532. Further, it is noted that the content server and applications server may be implemented on a single server. Also, such servers may be implemented on distributed computer systems as well as on cloud computer systems.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A device comprising:
a memory; and
a processor in communication with the memory, the processor operating in a white box implementation, and the processor being configured to:
split data processed in a first round to produce a first output value and a second output value, wherein the first output value equals the second output value, and wherein the first round is one round of a plurality of rounds;
encrypting the first and second output values with different functions, wherein the different functions provide protection to the processor from differential fault analysis attacks;
process a first input by a second round of the plurality of rounds to produce a third output, wherein the first input is based upon the first output value;
process a second input by the second round to produce a fourth output, wherein the second input is based upon the second output value;
process a third input by a third round of the plurality of rounds to produce a first share using a first weight, wherein the third input is based upon the third output;
process a fourth input by the third round to produce a second share using a second weight, wherein the first and second weights are complementary, wherein the fourth input is based upon the fourth output;
combine the first share and the second share to produce a combined output; and
process the combined output by a fourth round; and
performing further processing of the combined output to produce a cryptographic key.

2. The device of claim 1, wherein the plurality of rounds include a substitution function and an affine transformation.

3. The device of claim 1, wherein:
the cryptographic operation is an advanced encryption standard (AES) operation;
a round includes a matrix multiplication of the intermediate state by a matrix $M_r$, where r specifies the round;
processing the third input by a third round to produce a first share using a first weight includes multiplying $M_3$ by $$\begin{pmatrix} \alpha_0 & 0 & \cdots & 0 \\ 0 & \alpha_1 & \cdots & 0 \\ \vdots & \vdots & \ddots & \vdots \\ 0 & 0 & \cdots & \alpha_{15} \end{pmatrix};$$

and
processing the fourth input by a third round to produce a first share using a second weight includes multiplying $M_3$ by $$\begin{pmatrix} \alpha_0 \oplus 1 & 0 & \cdots & 0 \\ 0 & \alpha_1 \oplus 1 & \cdots & 0 \\ \vdots & \vdots & \ddots & \vdots \\ 0 & 0 & \cdots & \alpha_{15} \oplus 1 \end{pmatrix}.$$

4. The device of claim 3, wherein combining the first share and the second share to produce a combined output includes XORing the first share and the second share.

5. The device of claim 1, wherein the cryptographic operation is a data encryption standard (DES) operation.

6. The device of claim 1, wherein the first weight is randomly generated by a random generator for each execution of the third round.

7. The device of claim 1, wherein the first weight is randomly generated by a hardware random generator for each execution of the third round.

8. The device of claim 1, wherein the first weight is selected based upon the output of the first round.

9. A non-transitory machine-readable storage medium encoded with instructions, the instructions comprising:
- instructions for splitting data processed in a first round to produce a first output value and a second output value, wherein the first output value equals the second output value, wherein the first round is one round of a plurality of rounds, and wherein the instructions are executed in a processor operating in a white box implementation;
- instructions for encrypting the first and second output values with different functions, wherein the different functions provide protection to the processor from differential fault analysis attacks;
- instructions for processing a first input by a second round of the plurality of rounds to produce a third output, wherein the first input is based upon the first output value;
- instructions for processing a second input by the second round to produce a fourth output, wherein the second input is based upon the second output value;
- instructions for processing a third input by a third round of the plurality of rounds to produce a first share using a first weight, wherein the third input is based upon the third output;
- instructions for processing a fourth input by the third round to produce a second share using a second weight, wherein the first and second weights are complementary, wherein the fourth input is based upon the fourth output;
- instructions for combining the first share and the second share to produce a combined output;
- instructions for processing the combined output by a fourth round; and
- instructions for performing further processing of the combined output to produce a cryptographic key.

10. The non-transitory machine-readable storage medium of claim 9, wherein the plurality of rounds include a substitution function and an affine transformation.

11. The non-transitory machine-readable storage medium of claim 9, wherein:
- the cryptographic operation is an advanced encryption standard (AES) operation;
- a round includes a matrix multiplication of the intermediate state by a matrix $M_r$, where r specifies the round;
- the instructions for processing the third input by a third round to produce a first share using a first weight includes instructions for multiplying $M_3$ by $$\begin{pmatrix} \alpha_0 & 0 & \cdots & 0 \\ 0 & \alpha_1 & \cdots & 0 \\ \vdots & \vdots & \ddots & \vdots \\ 0 & 0 & \cdots & \alpha_{15} \end{pmatrix};$$

and
- the instructions for processing the fourth input by a third round to produce a first share using a second weight includes instructions for multiplying $M_3$ by $$\begin{pmatrix} \alpha_0 \oplus 1 & 0 & \cdots & 0 \\ 0 & \alpha_1 \oplus 1 & \cdots & 0 \\ \vdots & \vdots & \ddots & \vdots \\ 0 & 0 & \cdots & \alpha_{15} \oplus 1 \end{pmatrix}.$$

12. The non-transitory machine-readable storage medium of claim 11, wherein the instructions for combining the first share and the second share to produce a combined output includes instructions for XORing the first share and the second share.

13. The non-transitory machine-readable storage medium of claim 9, wherein the cryptographic operation is a data encryption standard (DES) operation.

14. The non-transitory machine-readable storage medium of claim 9, wherein the first weight is randomly generated by a random generator for each execution of the third round.

15. The non-transitory machine-readable storage medium of claim 9, wherein the first weight is randomly generated by a hardware random generator for each execution of the third round.

16. The non-transitory machine-readable storage medium of claim 9, wherein the first weight is selected based upon the output of the first round.

17. A method comprising:
- splitting data processed in a first round to produce a first output value and a second output value, wherein the first output value equals the second output value, wherein the first round is one round of a plurality of rounds, and wherein the instructions are executed in a processor operating in a white box implementation;
- encrypting the first and second output values with different functions, wherein the different functions provide protection to the processor from differential fault analysis attacks;
- processing a first input by a second round of the plurality of rounds to produce a third output, wherein the first input is based upon the first output value;
- processing a second input by the second round to produce a fourth output, wherein the second input is based upon the second output value;
- processing a third input by a third round of the plurality of rounds to produce a first share using a first weight, wherein the third input is based upon the third output;
- processing a fourth input by the third round to produce a second share using a second weight, wherein the first and second weights are complementary, wherein the fourth input is based upon the fourth output;
- combining the first share and the second share to produce a combined output;
- processing the combined output by a fourth round; and
- performing further processing of the combined output to produce a cryptographic key.

18. The method of claim 17, wherein the plurality of rounds include a substitution function and an affine transformation.

19. The method of claim 17, wherein:
- the cryptographic operation is an advanced encryption standard (AES) operation;
- a round includes a matrix multiplication of the intermediate state by a matrix $M_r$, where r specifies the round;
- processing the third input by a third round to produce a first share using a first weight includes multiplying $M_3$ by $$\begin{pmatrix} \alpha_0 & 0 & \dots & 0 \\ 0 & \alpha_1 & \dots & 0 \\ \vdots & \vdots & \ddots & \vdots \\ 0 & 0 & \dots & \alpha_{15} \end{pmatrix};$$

and processing the fourth input by a third round to produce a first share using a second weight includes multiplying $M_3$ by $$\begin{pmatrix} \alpha_0 \oplus 1 & 0 & \dots & 0 \\ 0 & \alpha_1 \oplus 1 & \dots & 0 \\ \vdots & \vdots & \ddots & \vdots \\ 0 & 0 & \dots & \alpha_{15} \oplus 1 \end{pmatrix}.$$

20. The method of claim 19, wherein combining the first share and the second share to produce a combined output includes XORing the first share and the second share.

21. The method of claim 17, wherein the cryptographic operation is a data encryption standard (DES) operation.

22. The method of claim 17, wherein the first weight is randomly generated by a random generator for each execution of the third round.

23. The method of claim 17, wherein the first weight is randomly generated by a hardware random generator for each execution of the third round.

24. The method of claim 17, wherein the first weight is selected based upon the output of the first round.

* * * * *